United States Patent [19]

Brockmann

[11] 4,349,080
[45] Sep. 14, 1982

[54] DRIVE UNIT FOR LAND VEHICLES

[75] Inventor: Heinz Brockmann, Bad Homburg, Fed. Rep. of Germany

[73] Assignee: Klöckner-Humboldt-Deutz Aktiengesellschaft, Cologne, Fed. Rep. of Germany

[21] Appl. No.: 98,389

[22] Filed: Nov. 29, 1979

[30] Foreign Application Priority Data

Dec. 4, 1978 [DE] Fed. Rep. of Germany ....... 2852411

[51] Int. Cl.³ ............................................. B62D 11/02
[52] U.S. Cl. ................................... 180/301; 89/36 H; 180/6.7; 180/54 A; 180/68 R; 180/291; 60/39.07
[58] Field of Search ................... 180/301, 6.7, 9.24 R, 180/62, 291, 312, 54 A, 68 R; 89/36 H; 60/39.07, 39.14 M; 415/90

[56] References Cited

U.S. PATENT DOCUMENTS

| 2,854,085 | 9/1958 | Bachle | 180/301 |
| 2,994,394 | 8/1961 | Underwood | 180/301 |
| 3,191,707 | 6/1965 | Peterson | 180/301 |
| 3,771,916 | 11/1973 | Flanigan et al. | 180/301 |
| 3,958,655 | 5/1976 | Kronogard | 180/301 |

FOREIGN PATENT DOCUMENTS

| 1347144 | 11/1963 | France | 89/36 H |
| 869597 | 5/1961 | United Kingdom | 180/301 |

OTHER PUBLICATIONS

M.A.N. Res. Eng. Mfg. (Germany), No. 1 (1971), pp. 30–37.

Primary Examiner—David M. Mitchell
Attorney, Agent, or Firm—Becker & Becker, Inc.

[57] ABSTRACT

A drive unit for land vehicles, especially track-laying vehicles armored on all sides. The drive unit has a gas turbine consisting of a gas generator and a useful turbine connected subsequent thereto which acts upon a drive axle by way of a drive or transmission. The gas turbine is arranged above the transmission, with the longitudinal axis thereof extending in direction of the vehicle longitudinal axis. The air inlet is provided near the upper wall, and the exhaust gas outlet is provided in the vicinity of the rear wall of the vehicle. The arrangement of the drive unit for a land vehicle permits the smallest possible construction and allows the installation of as many devices serving a military purpose as possible. Provision is also made for auxiliary devices to be operated independently of the traveling drive.

2 Claims, 3 Drawing Figures

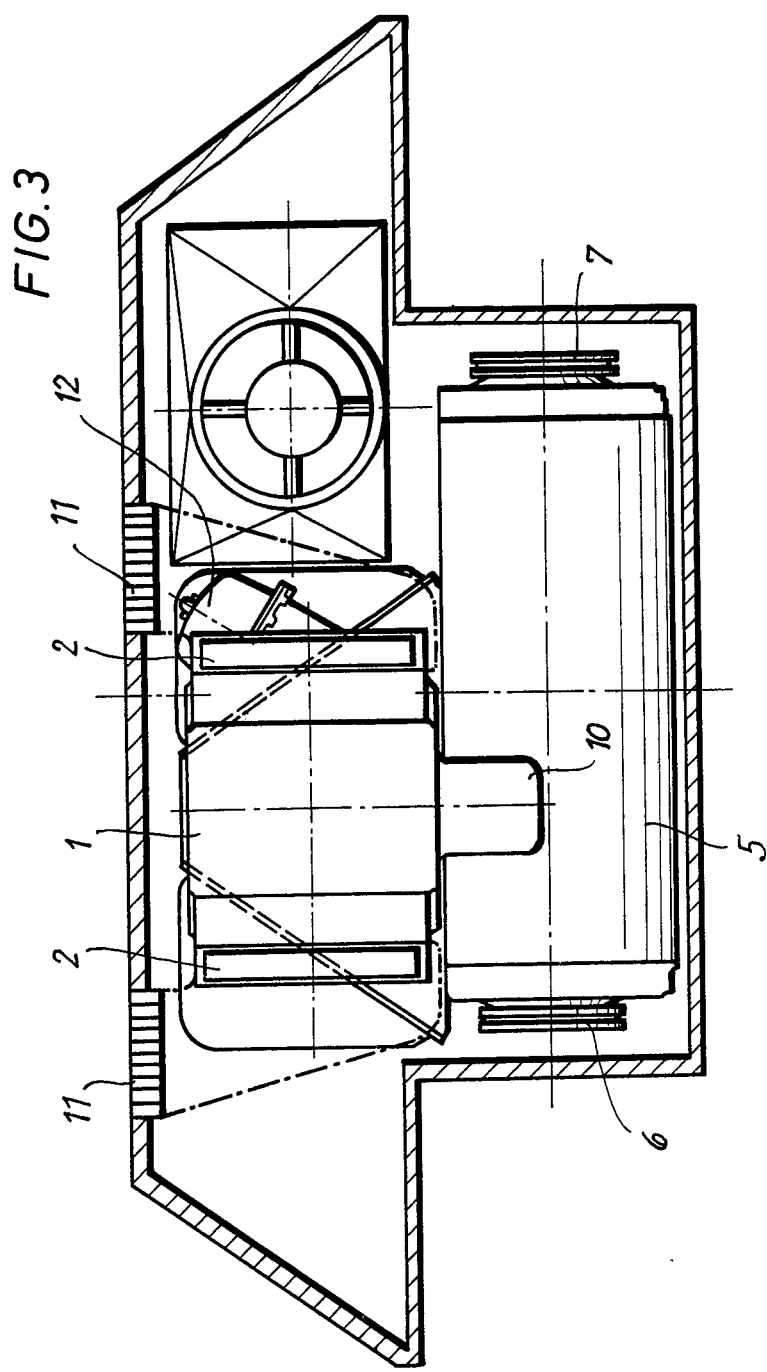

DRIVE UNIT FOR LAND VEHICLES

The present invention relates to a drive unit for land vehicles, especially track-laying vehicles shielded or armored on all sides, having a gas turbine, consisting of a gas generator and a useful turbine connected thereafter, which acts upon a drive axle by way of a drive, transmission gear or gear unit.

Especially with land vehicles armored on all sides, it is required that the construction size thereof be relatively small or that, with a predetermined construction size, there can be accommodated as many as possible devices serving military purposes.

The object of the present invention therefore is to provide an arrangement of the land vehicle drive unit which is as small as possible.

This object, and other objects and advantages of the present invention, will appear more clearly from the following specification in connection with the accompanying drawings, in which:

FIG. 3 is a cross section through the motor space of FIG. 1.

The drive unit of the present invention is characterized primarily in that the gas turbine is arranged above the drive or transmission, with its longitudinal axis extending in the direction of the vehicle longitudinal axis. In this connection, the air inlet is provided near the upper wall, and the exhaust gas outlet is provided near the rear wall of the vehicle. With this arrangement, an arrangement of the drive requiring minimum space for the gas turbine and the air suction and discharge or exhaust gas paths therefrom is created. By means of the invention, the advantages of the gas turbine, such as high output with small dimensions, nominal oil heat of the motor to be cooled off and not so great a necessity for cleanliness of the combustion air which is suctioned in as with a piston motor, are unified with the requirements for vehicle construction, including high output density in relation to the utilized space.

Further construction space can be saved with this two-level manner of construction of drive and transmission or output if the connection of the useful turbine to the drive is placed on the rear side of the vehicle. In order to make the drive for the necessary auxiliary devices independent of the turning movement of the useful turbine, it is additionally proposed that a drive connection be provided between the gas generator and the auxiliary devices. If additionally a shiftable coupling is provided between the gas generator and the useful turbine, the auxiliary devices can be connected independently of the travel drive.

If the gas turbine is arranged off center from the vehicle axis, as proposed in accordance with a further embodiment of the present invention, the oil cooling system can be arranged adjoining the gas turbine likewise above the drive. If especially in addition the transmission is arranged transverse to the vehicle longitudinal axis, the space requirement of the entire drive device can be decreased further. Thus, in accordance with the present invention, it is also possible to create a compact drive unit which provides a considerably smaller space requirement when compared with conventional drive units, without however having to sacrifice output capability.

Figure 1:
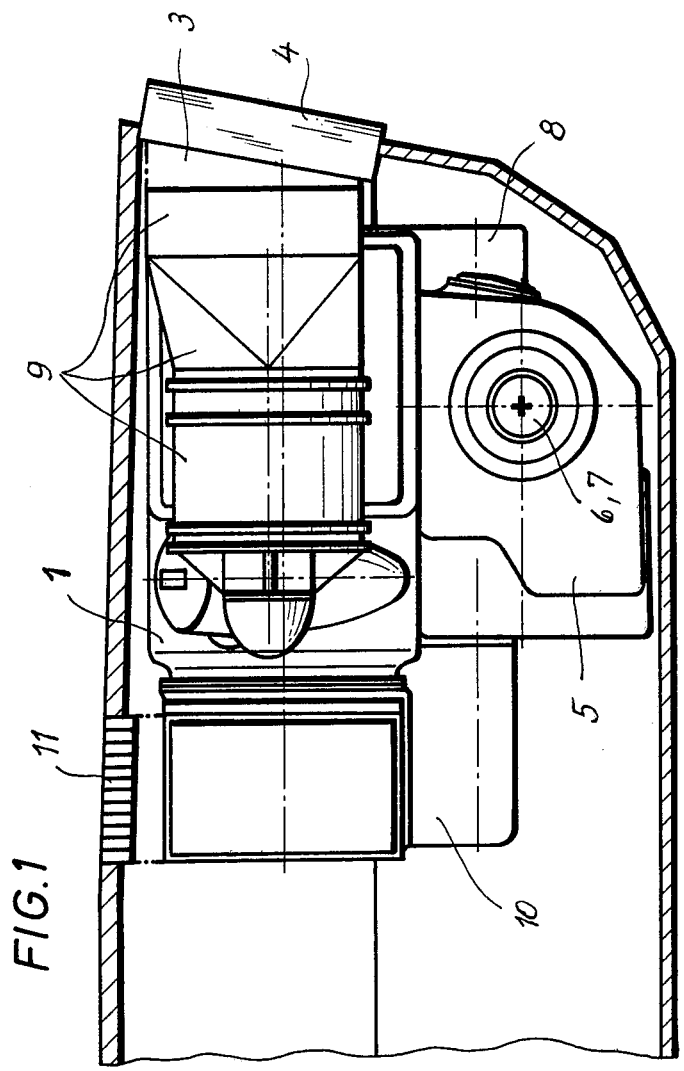
FIG. 1 shows a longitudinal section through the motor space of a track-laying vehicle, showing the present invention.

Referring now to the drawings in detail, FIG. 1 illustrates the drive unit of an armored vehicle. The drive unit comprises a gas turbine 1, which has a gas generator and a working turbine, an oil cooling system 9, a travel and steering or control drive 5 with the drive or output shafts 6 and 7 as well as a drive 8 between the working turbine and the travel and steering drive or transmission 5. The travel and steering drive for transmission 5 is of conventional design and has conventional auxiliary drive devices therein. The turbine set 1 is inventively arranged above the travel and steering drive 5. The compressor of the gas turbine 1 receives its fresh air through the openings 11 arranged on the vehicle upper surface (FIG. 1). The suctioned fresh air first passes into both air filters 2 (FIG. 2), which can be embodied as cyclone or double cyclone filters. The fresh air then passes into the compressor.

Figure 2:
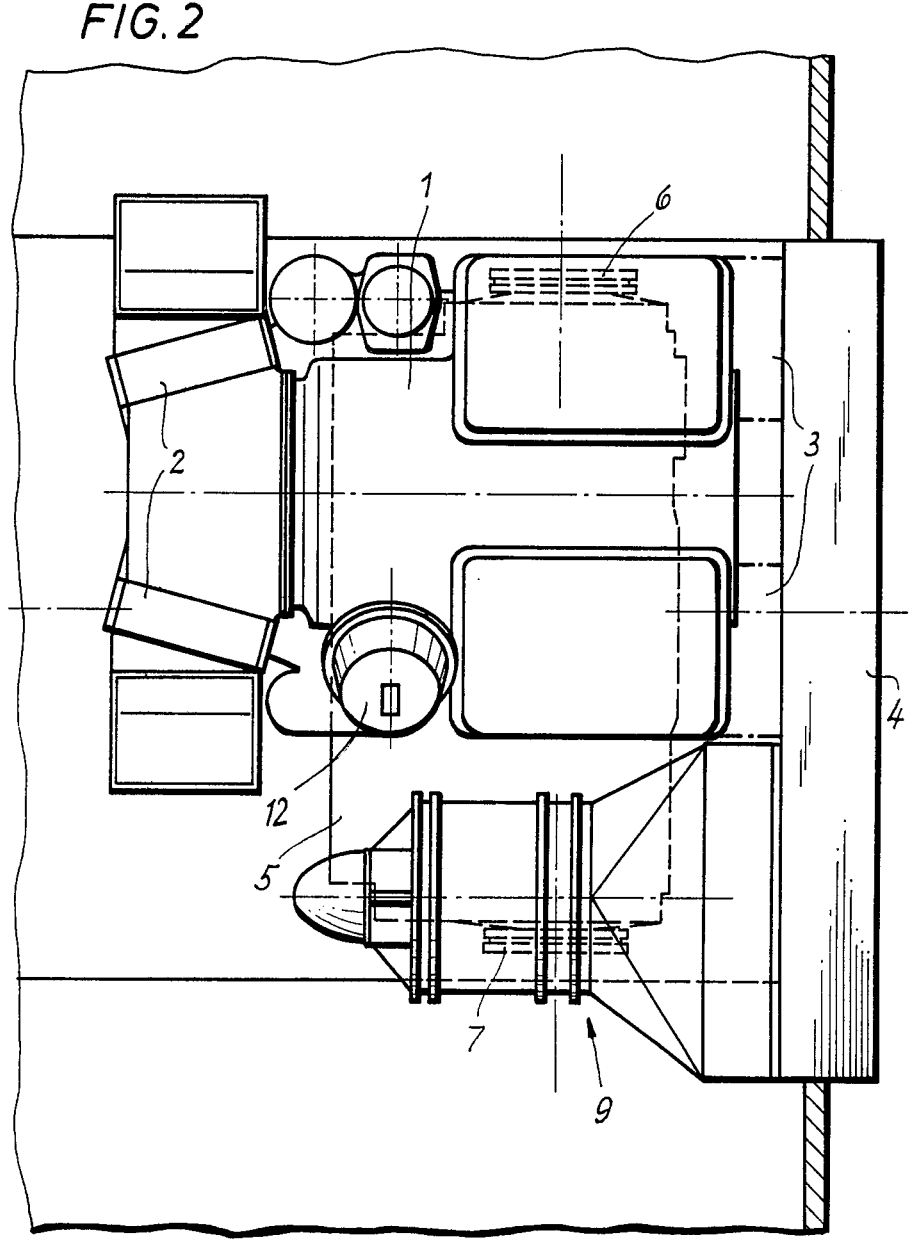
FIG. 2 is a plan view upon the moror space of FIG. 1.

Subsequently, the suctioned air is guided from the compressor to a heat exchanger, of which the exhaust gas opening 3 is illustrated in FIG. 2; from there the suctioned air is guided to a combustion chamber 12, through the gas generator turbine to the working turbine, and from there through the heat exchanger by way of the exhaust gas opening thereof through the rear wall 4 into the open air or atmosphere. By way of the working turbine, which is arranged on the rear end of the drive unit, there is created a drive connection by way of a spur gear or wheel drive; the housing 8 of the drive connection is illustrated in FIGS. 1 and 3, with such drive connection extending into the downwardly located travel and guiding or steering drive 5.

A further drive connection, which is arranged in the housing 10, leads from the gas generator likewise into the travel and guiding or steering drive 5 in order to power or drive the auxiliary devices located there such as, for example, current supply, steering and shifting auxiliary pumps, and the like. In this case, it is purposeful to arrange a shiftable coupling between the working turbine and the gas generator. As a result, the auxiliary devices can be driven independently of the travel drive (working turbine).

When the turbine set 1 is arranged off center with respect to the vehicle longitudinal axis, then adjacent thereto sufficient space is available to arrange the oil cooling system 9. Especially in FIG. 3, which represents a cross section through an armored vehicle with a view upon the drive mechanism space, it is apparent how the gas turbine 1 and the oil cooling system 9 are arranged with the longitudinal axes thereof parallel with respect to each other and with respect to the vehicle longitudinal axis above the travel and guiding or control drive 5, which is installed transverse to the vehicle longitudinal axis. Furthermore, it is recognizable from FIG. 3 that the dimensions of the turbine set are extremely small, so that the entire drive unit of the vehicle requires considerably less space than was the case previously with an internal combustion engine as a drive unit of the travel and guiding drive.

The present invention is, of course, in no way restricted to the specific disclosure of the specification and drawings, but also encompasses any modifications within the scope of the appended claims.

What I claim is:

1. A drive unit for a tracked armored land vehicle, wherein the vehicle is defined by a body having front and rear ends extending generally across a longitudinal axis and sides extending generally parallel but in spaced relation to the longitudinal axis;

a gas turbine including a gas generator section and a vehicle drive section aligned with and positioned aft of the gas generator section, the gas turbine having a longitudinal axis and being mounted within the vehicle body with the gas generator section positioned in front of the vehicle drive section and with the longitudinal axis of the gas generator displaced laterally but extending parallel to the longitudinal axis of the vehicle body;

an air inlet in front of the gas generator section of the gas turbine;

an exhaust aft of the vehicle drive section of the gas turbine;

drive axle means for driving the vehicle mounted in the vehicle body and extending perpendicular to the longitudinal axis of the vehicle body;

a transmission having a longitudinal axis coextensive with the drive axle means, the transmission and drive axle means being mounted in the vehicle body beneath the gas turbine and extending perpendicular to the gas turbine;

means for connecting the vehicle drive section of the gas turbine to the transmission, said connecting means extending vertically down from the vehicle drive section to the transmission aft of the transmission;

auxillary connection means for connecting the gas turbine to drive auxiliary drive devices within the transmission by connecting the gas generator thereto, said auxillary connecting means extending down from the gas generator in front of the transmission, and an oil cooler for the gas turbine and vehicle, the oil cooler having a longitudinal axis extending parallel with the axis of the gas turbine and being mounted beside the gas turbine on top of the transmission whereby a compact power supply and drive unit is provided for the vehicle.

2. The drive unit of claim 1 wherein the vehicle with which the drive device is used includes an armored top, wherein the drive unit is mounted adjacent the rear end of the vehicle body; wherein the air inlet means for supplying air to the gas generator include openings through the armored top of the vehicle just in front of the gas generator, and wherein the rear end of the vehicle includes exhaust openings therethrough to which the exhaust of the gas turbine is connected.

* * * * *